United States Patent
Nakamura et al.

(10) Patent No.: US 7,701,448 B2
(45) Date of Patent: Apr. 20, 2010

(54) LIQUID CRYSTAL DISPLAY DEVICE ACHIEVING IMAGING WITH HIGH S/N RATIO USING INVISIBLE LIGHT

(75) Inventors: Hiroki Nakamura, Ageo (JP); Takashi Nakamura, Saitama (JP); Hirotaka Hayashi, Fukaya (JP); Norio Tada, Kumagaya (JP); Takayuki Imai, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 567 days.

(21) Appl. No.: 11/695,235

(22) Filed: Apr. 2, 2007

(65) Prior Publication Data

US 2007/0296688 A1  Dec. 27, 2007

(30) Foreign Application Priority Data

Jun. 22, 2006  (JP) .............................. 2006-172562

(51) Int. Cl.
G09G 3/36 (2006.01)
G06F 3/042 (2006.01)

(52) U.S. Cl. .......................... 345/175; 345/87; 345/173; 178/18.01

(58) Field of Classification Search ........... 345/87–102, 345/173–178; 178/18.01–18.11
See application file for complete search history.

(56) References Cited

U.S. PATENT DOCUMENTS

| 6,243,069 | B1 | 6/2001 | Ogawa et al. | |
| 6,825,828 | B2 * | 11/2004 | Burke et al. | 345/102 |
| 7,002,555 | B1 * | 2/2006 | Jacobsen et al. | 345/173 |
| 7,586,479 | B2 * | 9/2009 | Park et al. | 345/102 |
| 2008/0062116 | A1 * | 3/2008 | Morbieu et al. | 345/102 |

FOREIGN PATENT DOCUMENTS

| JP | 2001-292276 | 10/2001 |
| JP | 2001-339640 | 12/2001 |

* cited by examiner

*Primary Examiner*—David L Lewis
(74) *Attorney, Agent, or Firm*—Oblon, Spivak, McClelland, Maier & Neustadt, L.L.P.

(57) ABSTRACT

A liquid crystal panel brightness controller notifies a backlight controller that an illuminance of ambient light is equal to or less than a threshold value. Upon notification, the backlight controller causes invisible light emitted, for example. The invisible light passes through a liquid crystal panel and is reflected by an imaging target and is received by photosensors. Accordingly, the decrease in the amount of the visible light received by photosensors is compensated. As a result, an image with a high S/N ratio is obtained.

2 Claims, 4 Drawing Sheets

FIG. 2A
FIG. 2B
ILLUMINANCE (HIGH)
ILLUMINANCE (LOW)
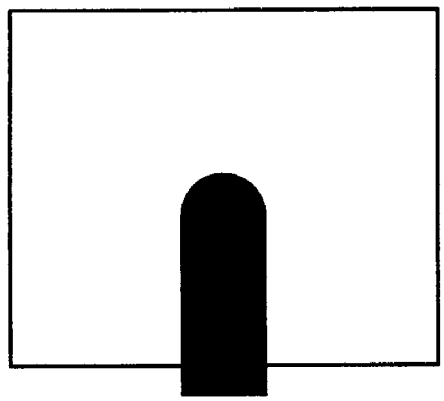
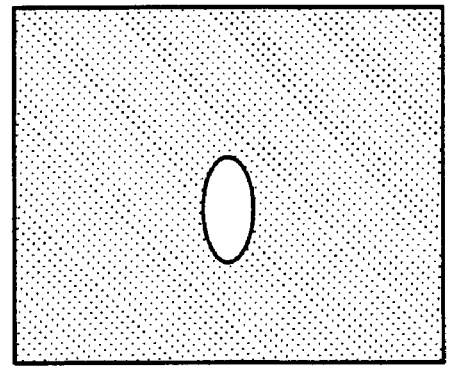

LIQUID CRYSTAL DISPLAY DEVICE ACHIEVING IMAGING WITH HIGH S/N RATIO USING INVISIBLE LIGHT

CROSS-REFERENCE TO RELATED APPLICATIONS

This application is based upon and claims the benefit of priority from Japanese Patent Application No. 2006-172562 filed Jun. 22, 2006; the entire contents of which are incorporated herein by reference.

BACKGROUND OF THE INVENTION

1. Field of the Invention

The present invention relates to a liquid crystal display device achieving imaging with a high S/N ratio using an invisible light source in addition to a visible light source.

2. Description of the Related Art

A liquid crystal display device has an array substrate in which signal lines, scanning lines, thin film transistors (TFT) and the like are formed. The device also has a driving circuit for driving the signal lines and the scanning lines.

Recently, as the technology in integrated circuit has been developed, TFTs and a driving circuit can be formed in an array substrate by polysilicon process.

This makes a liquid crystal device be miniaturized. And the device is widely used in a portable device such as a mobile phone and a laptop computer.

There is a liquid crystal display device that performs imaging. In this device, photoelectric conversion elements are arranged in an array substrate. The elements can also be formed in an array substrate by polysilicon process. For example, the elements are used to detect an area of a liquid crystal panel that is touched by a finger, and the like.

Such device is disclosed in Japanese Unexamined Patent Application Laid-open Nos. 2001-292276 and 2001-339640.

To obtain an image of a target, a capacitor is charged firstly. Then, a photoelectric conversion element discharges the capacitor based on amount of light that is reflected by the target to be received by the element. After a certain period of time, the device detects voltage of the capacitor and converts the voltage into an image.

By using the image of the target, a finger, for example, the device detects a position or motion of the finger. The device detects change in shape or darkness of a portion in the image corresponding to a portion of the liquid crystal panel which is touched by the finger, and the like. The portion in the image is hereinafter referred to as a touched-portion. On the contrary, the portion in the image corresponding to the portion that is not touched is hereinafter referred to as an untouched-portion.

By using result of detection, the device judges on whether the finger, and the like touches the panel or not. Such operation is hereinafter referred to as touch-detection.

When an illuminance of ambient light is high, the finger blocks the ambient light. An image in which the touched-portion is very dark while the untouched-portion is very bright is obtained. That is, an image with a high signal-to-noise (S/N) ratio is obtained.

In case that the ambient light is dark, the device receives a light that passes through the liquid crystal panel and is reflected by the finger. An image in which the touched-portion is very bright while the untouched-portion is very dark is obtained. That is, an image with a high S/N ratio is obtained.

In case that the ambient light is dark, in order to obtain an image with a high S/N ratio, it is necessary to increase a brightness of the liquid crystal panel. Increasing an intensity of light from a backlight can do it. Changing gradation values of an image to be displayed can also do it.

But in this case, it is preferable to decrease the brightness of the liquid crystal panel along with the intensity so as to reduce an amount of glare.

In case the brightness of the liquid crystal panel is decreased so as to reduce the amount of glare, or in case that an image which makes the brightness decreased is displayed, it becomes difficult to obtain an image with a high S/N ratio. And it becomes likely that misdetection in the touch-detection happens.

The present invention has been made in view of the foregoing points. An object of the present invention is to provide a liquid crystal display device capable of obtaining an image with a high S/N ratio even if the ambient light is dark and the brightness of the liquid crystal panel is decreased.

SUMMARY OF THE INVENTION

A liquid crystal display device according to a first aspect of the present invention is characterized by including: a liquid crystal panel including a liquid crystal layer; photosensors disposed in the liquid crystal panel; a backlight being disposed on a back side of the liquid crystal panel, and including a visible light source and a invisible light source; an imaging means configured to obtain an image of an imaging target located on a front side of the liquid crystal panel based on amount of light that is emitted from the backlight and passes through the liquid crystal panel and is reflected by the imaging target and is received by the photosensors; an illuminance measuring means configured to measure illuminance of ambient light; a visible light source controller means configured to control the visible light source to decrease intensity of the visible light if the measured illuminance is equal to or less than a threshold value set in advance; and an invisible light source controller means configured to control the invisible light source to cause the invisible light emitted or increases intensity of the invisible light if the measured illuminance is equal to or less than the threshold value.

According to the first aspect of the present invention, the invisible light passes through the liquid crystal panel and is reflected by the imaging target and is received by the photosensors, thus, total amount of received light can be larger than total amount of light to be received in the case the invisible light source is not used. As a result, an image with a high S/N ratio can be obtained even if brightness of the liquid crystal panel is decreased.

In the device, the visible light source controller means controls the intensity of the visible light in case the illuminance of the ambient light is decreased, and the invisible light source controller means controls the intensity of the invisible light not necessary in case the illuminance of the ambient light is high. It is possible to control the intensity of the visible light and the invisible light precisely. As a result, reducing power consumption can be done.

In the device, the illuminance measuring means measures the illuminance of ambient light so as to control the intensity of the visible light and the invisible light, so monitoring an intensity of ambient light can be done.

A liquid crystal display device according to a second aspect of the present invention is characterized in that a peak of wavelength of the invisible light is equal to or more than 760 nm, and equal to or less than 1000 nm. Others are same as those of the first aspect of the present invention.

In the second aspect of the present invention, a peak of wavelength of the invisible light is equal to or more than 760 nm, and equal to or less than 1000 nm. Accordingly, the device is prevented from adversely affecting eyes.

BRIEF DESCRIPTION OF THE DRAWINGS

FIG. 2A shows an image of an imaging target (a finger) obtained when the illuminance of ambient light is relatively high;

FIG. 2B shows an image of an imaging target (a finger) obtained when the illuminance of ambient light is relatively low;

DESCRIPTION OF THE EMBODIMENT

Figure 1:
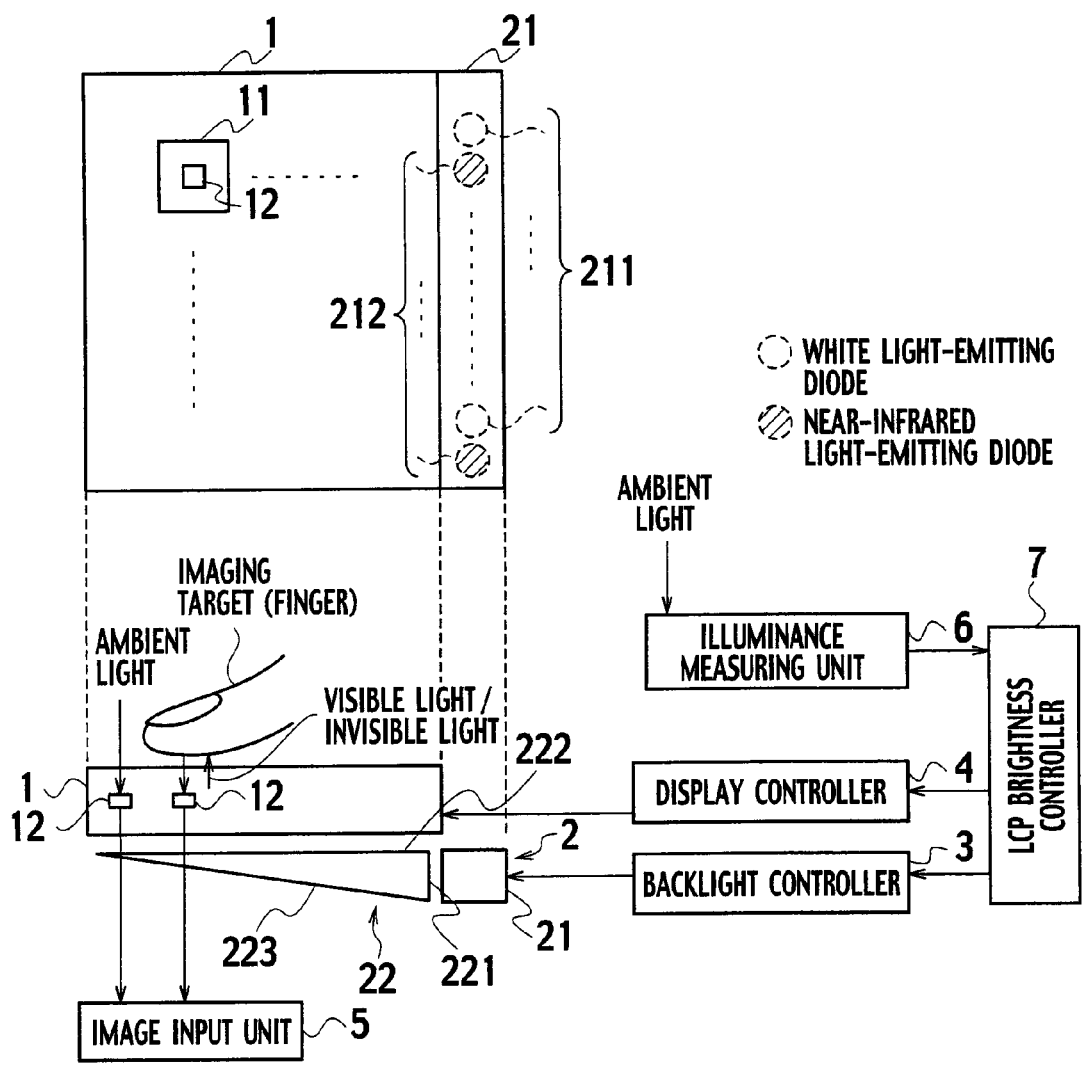
FIG. 1 shows a plane figure, a side figure and an inside block diagram of a liquid crystal display device according to an embodiment.

As shown in FIG. 1, a liquid crystal display device according to an embodiment (hereinafter referred to as the device) has a liquid crystal panel 1, a backlight 2, a backlight controller 3, a display controller 4, an imaging unit 5, an illuminance measuring unit 6, and a liquid crystal panel brightness controller (hereinafter referred to as an LCP brightness controller) 7.

For displaying an image, display elements 11 are two-dimensionally arranged in the liquid crystal panel 1.

In the liquid crystal panel 1, photosensors 12 are also arranged. For example, each one or three display elements 11 have the photosensor 12.

Specifically, the liquid crystal panel 1 has a liquid crystal layer, an array substrate and an opposite substrate, all not shown in the figures. The liquid crystal layer is disposed between the two substrates.

In the array substrate, a plurality of signal lines and a plurality of scanning lines are disposed to cross each other. The display elements 11 are disposed respectively near the intersections of the signal lines and the scanning lines. In each of the display elements 11, a thin film transistor (TFT) and a pixel electrode are formed. The TFT is configured to turn on when a corresponding scanning line is driven. In the array substrate, a driving circuit for driving the signal lines and the scanning lines is formed.

On the opposite substrate, an opposite electrode is formed so as to face all of the pixel electrodes.

The backlight 2 has a light source unit 21 and a light-guiding plate 22, and is disposed on a back side of the liquid crystal panel 1.

The light source unit 21 has a visible light source 211 and an invisible light source 212, which are mounted on a substrate (not shown). The visible light source 211 has a plurality of white light-emitting diodes. The invisible light source 212 has a plurality of near-infrared light-emitting diodes. The light source unit 21 has a reflective plate (not shown). The reflective plate is formed of a white resin sheet or the like having high reflectivity.

A peak of wavelength of light emitted from the near-infrared light-emitting diodes (hereinafter referred to as invisible light) is equal to or more than 760 nm and equal to or less than 1000 nm.

The light-guiding plate 22 has a transparent resin having high refractive index (such as polycarbonate resin or methacrylate resin). The light-guiding plate 22 has a light incident surface 221, a light emitting surface 222 and an opposite surface 223. The opposite surface 223 is inclined to and faces the light emitting surface 222.

In many cases, a diffuse reflection layer, reflecting grooves or the like having specific density distribution and size are formed on the light emitting surface 222 and the opposite surface 223.

The light incident surface 221 faces the light source unit 21. The light emitting surface 222 faces the back side of the liquid crystal panel 1.

The backlight controller 3 is configured to change intensity of light emitted from the visible light source 211 (hereinafter referred to as visible light) and intensity of the invisible light.

The display controller 4 is configured for displaying an image on the liquid crystal panel 1. The display controller 4 controls the driving circuit in the liquid crystal panel 1 so as to set a voltage of each of the pixel electrodes by using the signal lines and the TFTs. Thereby, the display controller 4 sets the electric field intensity and the transmittance of light in the liquid crystal layer. As a result, an image is displayed.

The imaging unit 5 is configured to obtain an image of an imaging target located on a front side of the liquid crystal panel based on an amount of light that is emitted from the backlight 2 and passes through the liquid crystal panel 1 and is reflected by the imaging target and is received by the photosensors 12.

To obtain an best image in case an ambient light is dark and also in case the ambient light is bright, it is preferable to calculate a value corresponding to an illuminance of the ambient light based on a condition of an illuminance on the liquid crystal panel and an obtained image, and to control a time of exposure of the photosensors 12 and to control a voltage to charge a capacitor used in the photosensor 12.

The illuminance measuring unit 6 is configured to measure an illuminance of ambient light. The measurement may be done by calculating a numerical value corresponding to the illuminance using the obtained image. An illuminance sensor located outside a display area in the liquid crystal display panel may be used. An illuminance sensor located outside the liquid crystal display panel may be used.

The LCP brightness controller 7 is configured to change a brightness of the liquid crystal panel 1.

The backlight controller 3 and the LCP brightness controller 7 are configured to realize a visible light source controller means that controls the visible light source 211 to decrease intensity of the visible light if the measured illuminance is equal to or less than a threshold value set in advance and an invisible light source controller means that controls the invisible light source 212 to cause the invisible light emitted or increase intensity of the invisible light if the measured illuminance is equal to or less than the threshold value.

The backlight controller 3, the display controller 4, the imaging unit 5, the illuminance measuring unit 6 and the LCP brightness controller 7 are, for example, integrated (to be an IC) outside the liquid crystal panel 1. Any of these may be formed in the array substrate by polysilicon process.

[Operations of the Device]

Next, operations of the device will be described.

Firstly, the display controller 4 will be described. For displaying an image, a gradation value is calculated for each display element 11. Amount of the gradation value depends on contents of an image to be displayed. For each display element 11, the display controller 4 controls the driving circuit in the liquid crystal panel 1 so as to set a voltage of each of the pixel electrodes by using the signal line and the TFT. Accordingly, electric field intensity in the liquid crystal layer corresponds to the gradation value. As a result, distribution of transmittance of light in the liquid crystal panel 1 corresponds to the contents of the image.

On the other hand, the visible light emitted from the visible light source 211 enters into the light-guiding plate 22 from the light incident surface 221. Thereafter, the visible light propagates in the light-guiding plate 22 while repeating total reflection between the light emitting surface 222 and the opposite surface 223. Then, the light emitting surface 222 emits the visible light.

By using the diffuse reflection layer, the reflecting groove or the like, the light can effectively propagates. By setting their shapes, density distributions or the like, the light emitting surface 222 can emit the light uniformly. The visible light emitted from the light-guiding plate 22 enters into the liquid crystal panel 1. As previously mentioned, the distribution of transmittance of light in the liquid crystal panel 1 corresponds to the image. Thus, distribution of intensity of visible light that is emitted from the front side of the liquid crystal panel 1 corresponds to the image. That is, the image is displayed.

Next, the imaging unit 5 will be described. The imaging unit 5 obtains an image of an imaging target such as a finger.

When obtaining an image of the target, part of the visible light emitted from the liquid crystal panel 1 is reflected by the target. The photosensors 12 receive the reflected light. The photosensors 12 also receive part of ambient light that is not blocked by the imaging target. Accordingly, distribution of amount of light that is received by the photosensors 12 corresponds to the shape of the imaging target.

The imaging unit 5 receives electric signals with a level corresponding to the amount from the respective photosensors 12. Then, the imaging unit 5 converts the level into a gradation value respectively. So, distribution of the gradation values is obtained. That is, an image of the imaging target is obtained.

Based on the image, the device detects a position or motion of the imaging target such as a finger. The device detects change in shape or darkness of a portion in the image corresponding to a portion of the liquid crystal panel 1 which is touched by the finger, and the like. That is, the device detects change in shape or darkness of the touched-portion.

By using result of detection, the device judges on whether the finger, and the like touches the liquid crystal panel 1 or not. That is, the device performs the touch-detection.

FIG. 2A shows an image of an imaging target (a finger) obtained when the illuminance of ambient light is relatively high. FIG. 2B shows an image of the imaging target (a finger) obtained when the illuminance is relatively low.

When the illuminance is high, the touched-portion is very dark like a shadow and the untouched-portion is very bright. The device detects the shadow as the touched-portion and detects barycentric coordinates of the shadow.

On the other hand, when the illuminance is low, the touched-portion is very bright and the untouched-portion is moderately bright. The device detects the very bright portion as the touched-portion and detects the barycentric coordinates of the potion.

The device treats the detected barycentric coordinates as coordinates of a position in the liquid crystal panel 1 which is touched by the finger.

In this manner, the device selects one of two detection modes based on the illuminance. Accordingly, the device can perform the touch-detection in a wide range of the illuminance.

With reference to FIG. 1 again, the backlight controller 3 will be described.

The backlight controller 3 controls the visible light source 211 to emit the visible light when displaying an image. Since the invisible light is not necessary for displaying an image, the backlight controller 3 controls the invisible light source 212 to keep the invisible light from being emitted for reducing power consumption. However, the invisible light does not affect an image to be displayed, the invisible light may be emitted. In this case, it is preferable to keep the intensity of the invisible light low to reduce power consumption.

Next, the illuminance measuring unit 6 and the LCP brightness controller 7 will be described. The illuminance measuring unit 6 measures the illuminance of ambient light. The illuminance measuring unit 6 notifies the measured illuminance to the LCP brightness controller 7. If the notified illuminance is equal to or less than the threshold value, the LCP brightness controller 7 controls the backlight controller 3 to decrease the intensity of the visible light. Accordingly, brightness of the liquid crystal panel 1 is decreased, so that the amount of glare is reduced.

Note that the brightness can be decreased by making an image to be displayed darker. However, this does not reduce power consumption. Therefore, it is preferable to increase transmittance of light in the liquid crystal panel 1 and decrease the intensity of the visible light. Accordingly, amount of glare is reduced and electric power is reduced.

Also note that, the device displays an image even when the device performs the touch-detection. For example, an image of a button indicating a position where the finger should be placed is displayed. The image is preferable to be brighter when the illuminance is low so that the image can easily be recognized.

As previously mentioned, when the illuminance is high, the device detects the shadow as the touched-portion. In this case, if the brightness of the liquid crystal panel 1 is decreased, an image with a high S/N ratio can be obtained. That is, the shadow becomes darker. Therefore, by doing such brightness control, the lower limit of the illuminance above which the device can detects the shadow as the touched-portion can be lowered.

Operations of the device will further be described. If the illuminance is equal to or less than the threshold value, the LCP brightness controller 7 notifies the backlight controller 3 on that. Upon notification, the backlight controller 3 causes the invisible light emitted from the invisible light source 212, or increase the intensity of the invisible light.

The invisible light emitted from the invisible light source 212 enters into the light-guiding plate 22 from the light incident surface 221. Thereafter, the invisible light propagates in the light-guiding plate 22 while repeating total reflection between the light emitting surface 222 and the opposite surface 223. Then, the light emitting surface 222 emits the invisible light.

The invisible light passes through the liquid crystal panel 1, and then is reflected by the imaging target to be received by the photosensors 12.

As previously mentioned, if the illuminance is equal to or less than the threshold value, the brightness of the liquid crystal panel 1 is decreased. This causes the amount of the visible light received by the photosensors 12 decreased.

However, the decrease in the amount of the visible light received by the photosensors 12 is compensated by the invisible light. Specifically, for example, the amount of the decrease becomes smaller. Or the amount of the decrease becomes zero, which means the amount of the received light is kept equal. Otherwise, to the contrary, the amount of the received light is increased. As a result, an image with a high S/N ratio can be obtained.

Note that the amount of glare can be kept small because the invisible light does not increase the brightness of the liquid crystal panel 1.

As mentioned, according to the present embodiment, even if the device decreases the brightness of the liquid crystal panel 1 along with the decrease in the illuminance, total amount of the received light can be larger than total amount of light to be received in case the invisible light source 212 is not used. As a result, the device can obtain an image with a high S/N ratio.

The near-infrared light-emitting diodes may be replaced by near-ultraviolet light-emitting diodes, which emit near-ultraviolet light with a peak of wavelength equal to or less than 400 nm. However, it is preferable to use the near-infrared light-emitting diodes that are harmless to eyes. Accordingly, the device is prevented from adversely affecting eyes.

Moreover, light having short wavelength such as near-ultraviolet light is likely to be absorbed by pigment in the skin of the finger. Therefore, when using such light, reflectivity of the surface of the finger is decreased.

On the other hand, light having a peak of wavelength in the visible light region or in the near-infrared light region is unlikely to be absorbed by the pigment. Therefore, when using such light, the reflectivity is increased and the S/N ratio can be high. Accordingly, such light is preferable.

In addition, there is a case where a protection plate is disposed on the front side of the liquid crystal panel 1. Even when the near-infrared light passes through a stained part of the protection plate, an intensity of the near-infrared light is unlikely to be decreased. Accordingly, also in this respect, the near-infrared light-emitting diodes are preferable.

Moreover, there is a case where color filters of red (R), green (G), and blue (B) are disposed in the liquid crystal panel 1. Regardless of a peak of wavelength of the near-infrared light, nearly 100% of the light passes through the red filter. And the transmittance of light in the green and blue filters is increased if a peak of wavelength of light is equal to or more than 760 nm (or 780 nm). Also in this respect, the near-infrared light-emitting diodes are preferable.

In a point of view regarding the above mentioned transmittance of light in the red filter, it is preferable to locate the photosensors 12 in the red filter. Since, where the red filter is located, the transmittance of light in the display elements is high, so an amount of light that passes through the panel and is reflected by an imaging target and is received by the photosensors 12 can be larger.

When using the visible light, there might be a restriction that transmittance of light in the liquid crystal panel 1 where the finger is to be placed should be high. However, because the near-infrared light passes through the liquid crystal panel 1 almost without being affected by the image and transmittance of the near-infrared light in polarizing plates disposed on the liquid crystal panel 1 is high, there is an advantage in that the device no longer has such restriction.

In case that the photosensors 12 are formed of polysilicon photodiodes, if a peak of wavelength of the near-infrared light is long, the sensitivity of the photosensors 12 is decreased. In this case, the peak of wavelength is preferable to be set short.

In case that reducing power consumption is not necessary, the invisible light such as the near-infrared light may always be emitted. The invisible light may have constant intensity.

Figure 3:
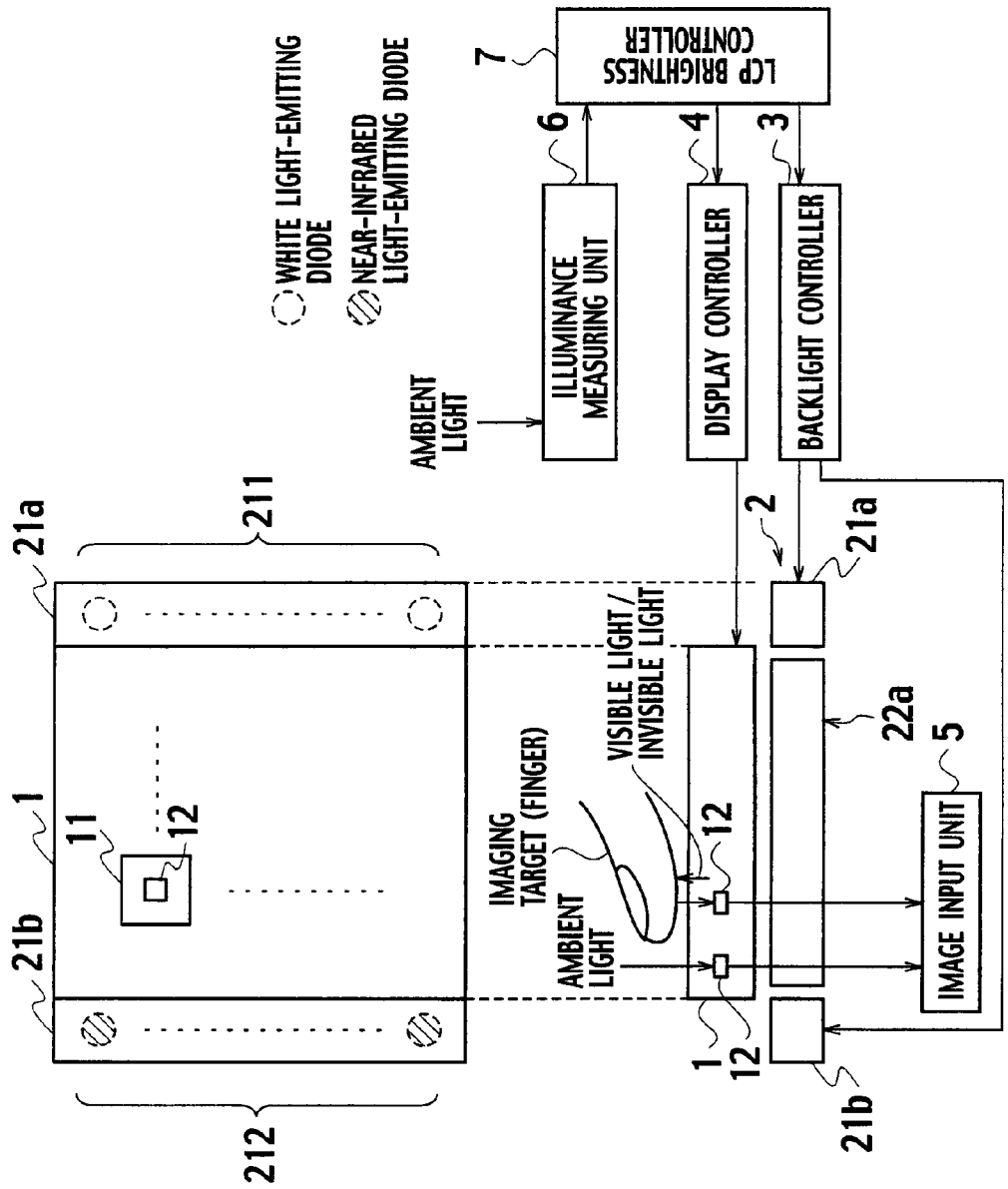
FIG. 3 shows a plane figure, a side figure and an inside block diagram of a liquid crystal display device according to a first modified example of the embodiment.

In addition, in a configuration shown in FIG. 3, used are a light source unit 21a having only the visible light source 211, a light source unit 21b having only the invisible light source 212 and a light-guiding plate 22a disposed between the light source units 21a and 21b. Principles of operation same as the above-described principle may be also applied to this configuration to be implemented.

Figure 4:
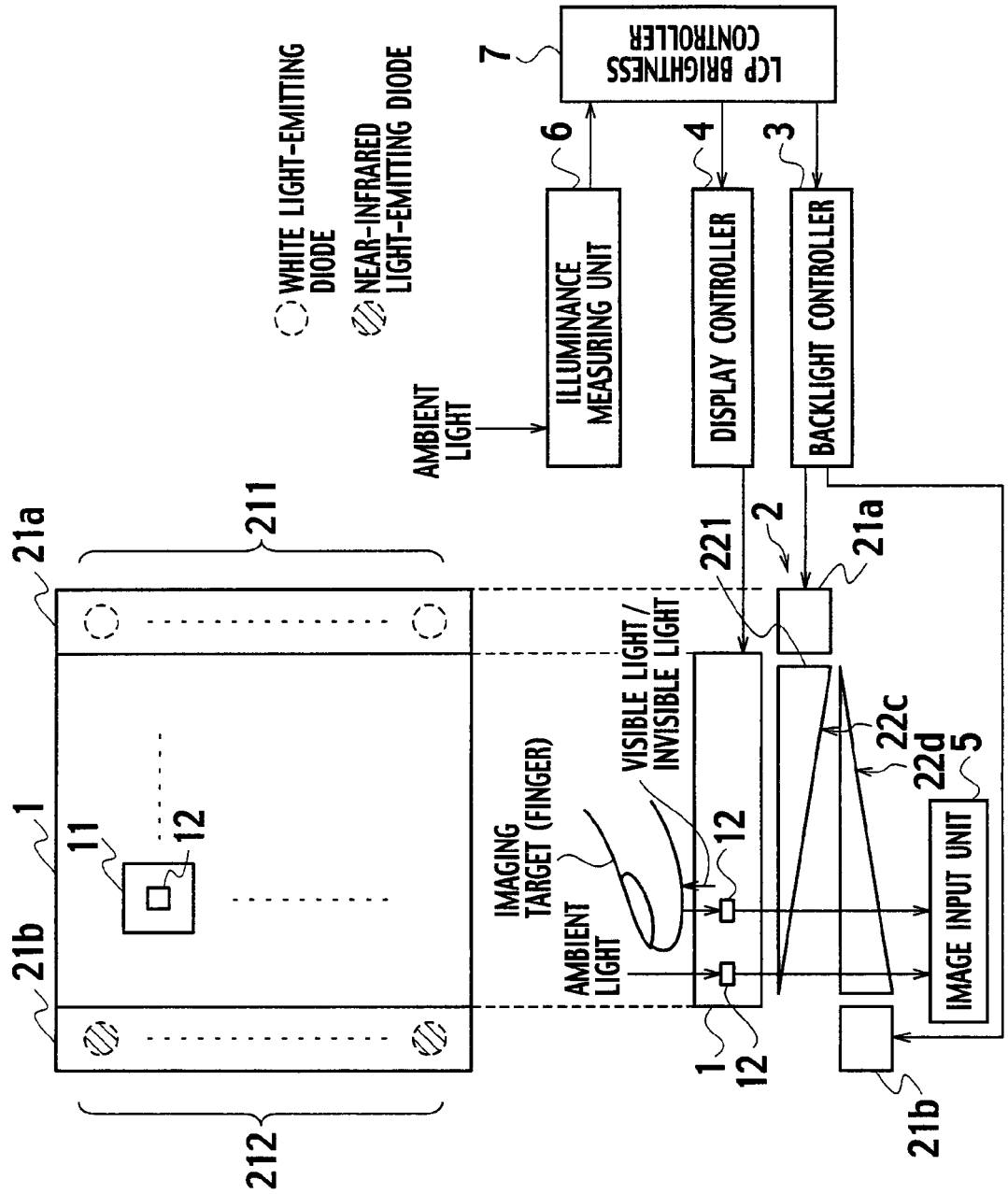
FIG. 4 shows a plane figure, a side figure and an inside block diagram of a liquid crystal display device according to another modified example of the embodiment.

Moreover, in a configuration shown in FIG. 4, used are a light source unit 21a having only a visible light source 211, a light-guiding plate 22c for this light source unit 21a, a light source unit 21b having only the invisible light source 212 and a light-guiding plate 22d for this light source unit 21b. Principles of operation same as the above-described principle may be also applied to this configuration to be implemented.

Furthermore, the present invention is not limited to the above-described embodiments, and constituent elements may be modified, omitted, combined or added as long as it does not depart from the scope of the present invention.

What is claimed is:

1. A liquid crystal display device comprising:
    a liquid crystal panel including a liquid crystal layer;
    photosensors disposed in the liquid crystal panel;
    a backlight being disposed on a back side of the liquid crystal panel, and including a visible light source and a invisible light source;
    an imaging means configured to obtain an image of an imaging target located on a front side of the liquid crystal panel based on amount of light that is emitted from the backlight and passes through the liquid crystal panel and is reflected by the imaging target and is received by the photosensors;
    an illuminance measuring means configured to measure illuminance of ambient light;
    a visible light source controller means configured to control the visible light source to decrease intensity of the visible light if the measured illuminance is equal to or less than a threshold value set in advance; and
    an invisible light source controller means configured to control the invisible light source to cause the invisible light emitted or increases intensity of the invisible light if the measured illuminance is equal to or less than the threshold value.

2. The liquid crystal display device according to claim 1, wherein a peak of wavelength of the invisible light is equal to or more than 760 nm, and equal to or less than 1000 nm.

* * * * *